UNITED STATES PATENT OFFICE.

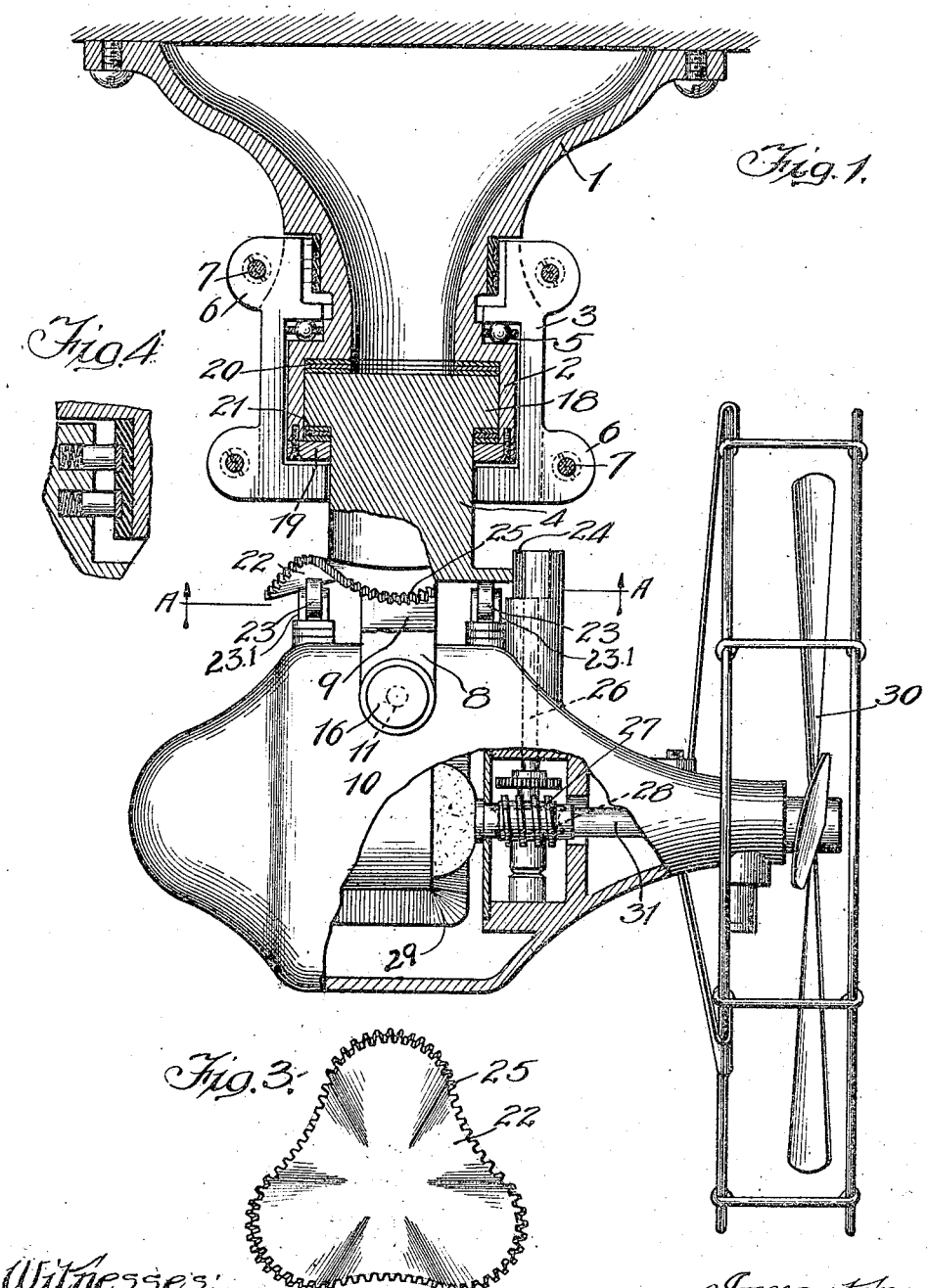

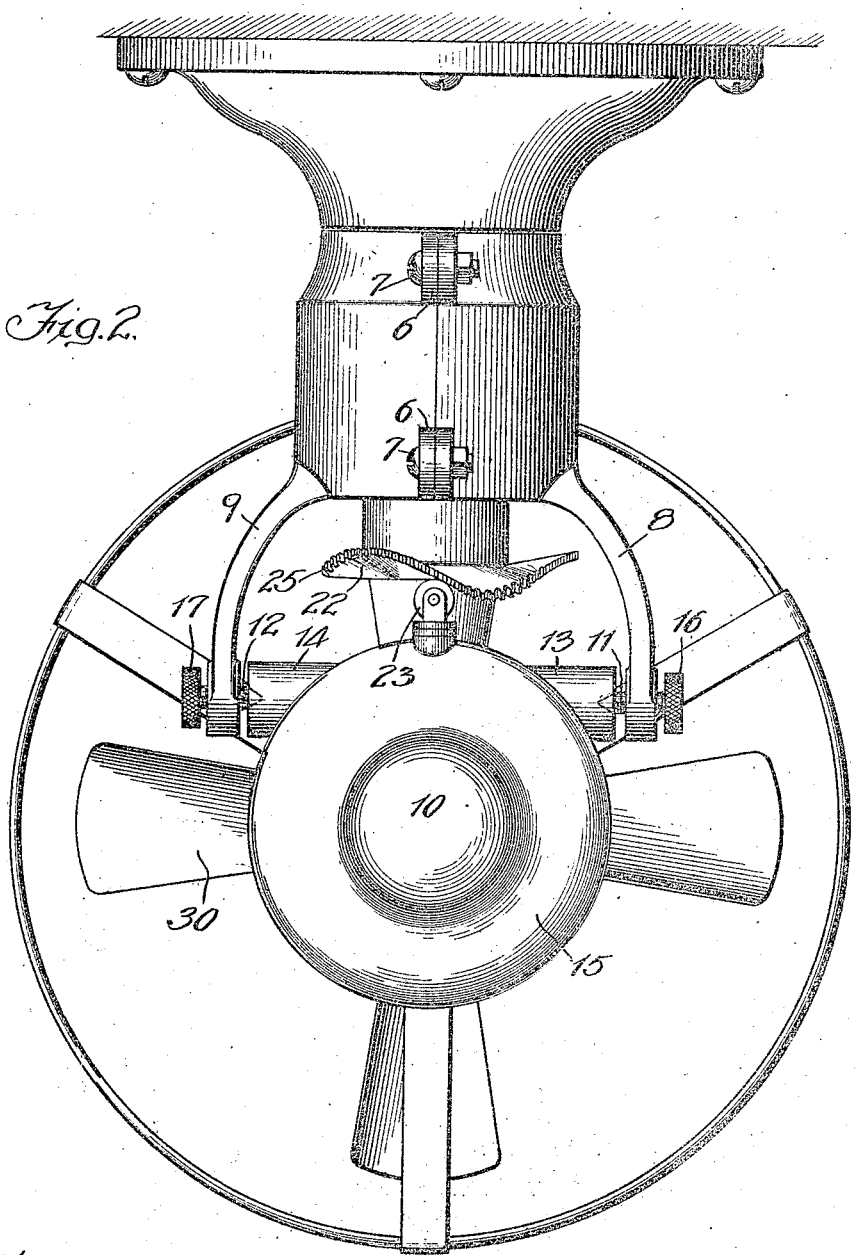

WILLARD M. McEWEN, OF CHICAGO, ILLINOIS.

CEILING-FAN.

1,246,967.   Specification of Letters Patent.   Patented Nov. 20, 1917.

Application filed June 21, 1916. Serial No. 105,032.

*To all whom it may concern:*

Be it known that I, WILLARD M. MCEWEN, a citizen of the United States of America, and a resident of Chicago, county of Cook, and State of Illinois, have invented certain new and useful Improvements in Ceiling-Fans, of which the following is a specification.

The main objects of this invention are to provide an electric fan particularly adapted for overhead mounting and for oscillation about both vertical and horizontal axes; and to provide means for supporting and operating such fan.

An illustrative embodiment of this invention is shown in the accompanying drawings, in which:

Figure 1 is a side elevation of the improved fan suspended from a ceiling bracket, a considerable part of the device being in section so as to more clearly illustrate the construction and arrangement thereof.

Fig. 2 is a rear elevation of the same.

Fig. 3 is a plan of the track as viewed from the plane of the line A—A of Fig. 1.

Fig. 4 is an enlarged sectional detail diagrammatically illustrating an arrangement of brushes and collector rings for a fan of this kind.

In the construction shown in the drawings, a bracket 1, which is shown suspended from the ceiling, has a hub 2 formed on the lower end thereof on the outside of which a member 3 is journaled and on the inside of which a shaft or member 4 is journaled concentrically of the member 3.

The member 3 is preferably a two piece construction adapted to be clamped together so as to be rotatably supported upon the hub 2 by means of a roller bearing 5. The clamping means for securing the two pieces together may be of any suitable form, an arrangement of ears 6 and bolts and nuts 7 being used in the drawing for the purpose of illustration.

Arms 8 and 9, integrally formed on the respective pieces of the member 3, extend outwardly and downwardly so as to provide a yoke upon which the blower-mechanism 10 is supported. Trunnions 11 and 12, in the form of threaded pins, are secured in the ends of the arms 8 and 9 so as to engage lugs 13 and 14 on an axis intersecting the casing 15 considerably inward of the periphery. The trunnion pins 11 and 12 are cone-shaped on their inner ends as shown in Fig. 2, and are provided with heads 16 and 17 on their outer ends so that they may be adjusted to properly engage the seats in the lugs 13 and 14.

The shaft 4 has the shank thereof reduced so as to provide a head 18 which is retained within the hub 2 by means of a suitable ring 19. Sets of washers 20 and 21 are interposed between the opposite faces of the head 18 and the opposed faces of the hub 2 and ring 19 respectively. Washers are used in place of roller bearings for the reason that although the former reduce materially the friction that would exist if the head 18 contacted directly with the faces of the hub 2, they create sufficient friction to insure a greater uniformity of oscillation of the fan as explained in my copending application Serial No. 55,267, filed October 11, 1915.

A wave-like track 22, in the nature of an outwardly disposed annular flange, is formed on the lower end of the shaft 4 so that when the shaft 4 is rotated it will coact with rollers 23, carried on the frame 15, for causing a tilting of the blower-mechanism 10 in a plane transverse to the axis of the trunnions 11 and 12. The rotation of the shaft 4 is effected by means of a pinion 24 journaled on the casing 15 and meshing with a rack 25 formed on the periphery of the track 22. The pinion 24 is carried on a shaft 26 which is rotated through the medium of a worm 27 and gear 28.

The rollers 23 are journaled in forks 23.1, which in turn are swiveled in the casing 15, on axes perpendicular to those on which the respective rollers rotate. This allows the rollers to adjust themselves more readily to their resultant direction of travel with respect to the track surface due to the rotation of the track 22 and the shifting of the rollers radially back and forth as the fan mechanism is tilted.

The blower-mechanism comprises a motor 29 journaled in the casing or frame 15 and having a fan or propeller 30 carried on the motor shaft 31. The shaft 31 carries the worm 27 which, through the medium of the gear 28, drives the pinion 24.

The same principle of oscillation as that explained in my Patent No. 1,214,198, granted January 30, 1917, is employed in this device. The blower mechanism is tilted up and down in a vertical plane by the members 23 coacting with the wavelike track 22. As the result of this tilting, the normally inactive gyratory forces inherent in the rotating fan blades become active and cause the blower mechanism and its supporting yoke to oscillate in a horizontal plane. The direction of oscillation is reversed with each upward and downward tilting of the blower mechanism, and the extent of the oscillation is controlled by the rapidity of the changes in the vertical tilting. In this connection, attention is called to the fact that no claim is herein made to the broad idea of a fan mechanism which is caused to oscillate back and forth in a horizontal plane, by reason of its being tilted up and down in a vertical plane. Such is the subject matter of my above mentioned patent. Likewise, no claim is herein made to the specific gear, pinion, and wavelike track mechanism by which the tilting of the blower mechanism is effected, this also being claimed in my said patent, above mentioned.

This arrangement of the supporting and operating parts for the fan mechanism is particularly advantageous for a ceiling fan. The entire weight of the fan mechanism is carried on the ball bearings 5, and since the pivotal connection of the fan mechanism with the member 3 is inwardly of the periphery of the frame or casing 15, the strain caused by the tilting of the fan mechanism is materially reduced over that encountered in the constructions illustrated in the aforesaid copending applications. Furthermore, the track 22 carries none of the weight of the fan mechanism as in the other structures, and therefore serves only as a guide member for causing the rollers 23 to effect the tilting of the fan mechanism. There is thus but little strain upon the shaft 4, so that the friction upon its bearing in the bracket 1 is comparatively small.

Although but one specific embodiment of this invention has been herein shown and described, it will be understood that numerous details of the construction shown may be altered or omitted without departing from the spirit of this invention as defined by the following claims.

I claim:

1. An air circulating device, comprising a support, a member journaled on said support, a yoke carried by said member, motor-driven blower-mechanism supported on said yoke, a second member journaled on said support within said first member and independently rotatable with respect thereto, and means carried by said blower-mechanism and coacting with said second member to cause said mechanism to tilt in a plane transverse to the pivotal connection of said yoke and mechanism, whereby gyratory forces are set up which cause the oscillation of said blower mechanism.

2. An air circulating device, comprising a support, a member journaled on said support, a yoke carried by said member, motor-driven blower-mechanism supported on said yoke, a shaft journaled on said support within said member, an outwardly disposed annular flange of wave-like form carried by said shaft, driving mechanism operated by the motor of said blower-mechanism and adapted to rotate said shaft, and rollers carried by said frame and engaging said flange so that said mechanism is tilted in a plane transverse to the pivotal axis of said frame and arms, whereby gyratory forces are set up which cause the oscillation of said mechanism.

3. An air circulating device, comprising a support, a member journaled on said support, a yoke carried by said member, motor-driven blower-mechanism supported on said yoke by having the ends thereof pivotally connected to the frame of said mechanism on an axis located inwardly from the periphery of said frame, means comprising relatively movable parts carried by said blower-mechanism and said member, and driving mechanism operated by the motor of said blower mechanism and adapted to cause said mechanism to tilt in a plane transverse to the pivotal axis of said yoke and frame, whereby gyratory forces are set up which cause the oscillation of said blower-mechanism.

4. An air circulating device, comprising a bracket, a member suspended therefrom and journaled to rotate thereon, a depending yoke carried by said member, motor-driven blower-mechanism suspended from said yoke by having the ends thereof pivotally connected to the frame of said mechanism on an axis inwardly of the periphery of said frame, means comprising relatively movable parts, carried by said blower-mechanism and said member, and driving mechanism operated by the motor of said blower mechanism and adapted to cause said mechanism to tilt in a plane transverse to the pivotal axis of said yoke and frame, whereby gyratory forces are set up which cause the oscillation of said blower-mechanism.

5. An air circulating device, comprising a depending bracket, a member journaled thereon and having outwardly and downwardly disposed arms carried thereby, motor-driven blower-mechanism suspended within said arms by having the ends thereof pivotally connected to the frame of said mechanism on an axis inwardly of the periphery of said frame, means comprising relatively movable parts, carried by said blower-mechanism and said member, and driving mechanism operated by the motor of said blower mechanism and adapted to cause said mechanism to tilt in a plane transverse to the pivotal axis of said yoke and frame, whereby gyratory forces are set up which cause the oscillation of said blower-mechanism.

6. An air circulating device, comprising a support, a member journaled on said support, a yoke carried by said member, motor-driven blower-mechanism supported on said yoke by having the ends thereof pivotally connected to the frame of said mechanism on an axis located inwardly from the periphery of said frame, a shaft journaled on said support within said member, an outwardly disposed annular flange carried by said shaft, and means on said mechanism operated by the motor of said mechanism and coacting with said flange to tilt said mechanism in a plane transverse to the pivotal axis of said frame and arms, whereby gyratory forces are set up which cause the oscillation of said mechanism.

7. An air circulating device, comprising a support, a member journaled on said support, a yoke carried by said member, motor-driven blower-mechanism supported on said yoke by having the ends thereof pivotally connected to the frame of said mechanism on an axis located inwardly from the periphery of said frame, a shaft journaled on said support within said member, an outwardly disposed annular flange of wave-like form carried by said shaft, driving mechanism operated by the motor of said blower-mechanism and adapted to rotate said shaft, and rollers carried by said frame and engaging said flange so that said mechanism is tilted in a plane transverse to the pivotal axis of said frame and arms, whereby gyratory forces are set up which cause the oscillation of said mechanism.

8. An air circulating device, comprising a support, a member journaled on said support, motor-driven blower-mechanism tiltably mounted on said member, a second member journaled on said support and rotatable independently of said first member, an outwardly disposed annular flange of wave-like form carried on said second member, driving mechanism operated by the motor of said blower-mechanism and adapted to rotate said second member, and rollers carried by said blower-mechanism and engaging said flange so that said mechanism is tilted in a plane transverse to the pivotal connection of said blower mechanism and said first mentioned member, whereby gyratory forces are set up which cause the oscillation of said mechanism, said rollers being swiveled on axes transverse to that on which they rotate.

9. An air circulating device, comprising a support, a member journaled on said support, a yoke carried by said member, motor-driven blower-mechanism supported on said yoke by having the ends thereof pivotally connected to the frame of said mechanism on an axis located inwardly from the periphery of said frame, a shaft journaled on said support within said member, an outwardly disposed annular flange of wave-like form carried by said shaft, driving mechanism operated by the motor of said blower-mechanism and adapted to rotate said shaft, and rollers carried by said frame and engaging said flange so that said mechanism is tilted in a plane transverse to the pivotal axis of said frame and arms, whereby gyratory forces are set up which cause the oscillation of said mechanism, said rollers being swiveled on said frame on axes transverse to that on which they rotate.

10. An air circulating device, comprising a support having a hub on the end thereof, a member journaled on the outside of said hub, a shaft journaled within said hub concentrically of said member, a pair of outwardly disposed diametrically arranged arch-shaped arms, motor-driven blower-mechanism tiltably supported on said arms by having the ends thereof pivotally connected to said mechanism on an axis located inwardly of the periphery of said frame, a wave-like track carried by said shaft, driving mechanism carried by said blower-mechanism and operated by the motor thereof and coacting with said flange to cause the rotation thereof relatively of said member and support, and rollers carried by said frame coacting with said track so as to cause said mechanism to be tilted in a plane transverse to the pivotal axis of said frame and arms, whereby gyratory forces are set up which cause the oscillation of said blower-mechanism.

Signed at Chicago this 19th day of June 1916.

WILLARD M. McEWEN.

Copies of this patent may be obtained for five cents each, by addressing the "Commissioner of Patents, Washington, D. C."